United States Patent
Moore et al.

[11] Patent Number: 5,651,332
[45] Date of Patent: Jul. 29, 1997

[54] INTERACTIVE PET DEVICE

[76] Inventors: Herbert Arthur Moore, 3741 Hunt Rd., Lapeer, Mich. 48446; Al Lynn Wilson, 3487 Esson Dr., Grand Blanc, Mich. 48439

[21] Appl. No.: 522,060

[22] Filed: Aug. 31, 1995

[51] Int. Cl.$^6$ .................................................. A01K 29/00
[52] U.S. Cl. .................................................. 119/708
[58] Field of Search .......................... 119/28.5, 706, 119/707, 708

[56] References Cited

U.S. PATENT DOCUMENTS

| | | | |
|---|---|---|---|
| 2,441,058 | 5/1948 | Carwile | 119/28.5 X |
| 4,803,953 | 2/1989 | Graves | 119/707 |
| 5,103,770 | 4/1992 | Berkovich | 119/708 |
| 5,163,381 | 11/1992 | Kraski | 119/708 |
| 5,184,568 | 2/1993 | Healey | 119/706 X |
| 5,188,063 | 2/1993 | Evans | 119/28.5 X |
| 5,474,026 | 12/1995 | Wohltjen | 119/706 X |
| 5,505,161 | 4/1996 | Swendseid | 119/708 |
| 5,524,326 | 6/1996 | Markowitz | 119/707 |

Primary Examiner—Robert P. Swiatek
Assistant Examiner—Elizabeth Shaw
Attorney, Agent, or Firm—Donald C. Bolger

[57] ABSTRACT

An entertaining exercise toy device, animated to stimulate all the natural playful instincts of a cat and that of a furniture footstool for the owner. The pet exercising toy footstool is comprised of a electrically animated mouse like creature suspended inside a simulated mouse hole, a replaceable drape curtain, an interior access sanctuary for the cat and a stool footrest for the owner. The device electrically animates the mouse in a random life like manner from virtually any location and may be operated by a remote control for use by the elderly, handicapped and people with impaired senses. The device operates in three modes automatic, interactive and inert. The unit can be activated to the on condition by the pet or operator and will turn itself off after an adjustable preset time delay. The animated toy is battery operated in a very low adjustable voltage range of 6 vdc for maximum safety and the unit may safely be left unattended. Cats are, by nature, playfully mischievous and like to chew on exposed cords. This device has no exposed high voltage cords tying it to the potentially dangerous house current.

10 Claims, 3 Drawing Sheets

INTERACTIVE PET DEVICE

BACKGROUND OF THE INVENTION

The field of the invention is generally that of amusement devices, and more specifically, to a novel toy for pet animals which includes interactive pet exerciser—furniture having a moveable object.

It will be appreciated by those skilled in the art that cats, being natural hunters and predators, have a need to claw and scratch. These sometimes destructive habits are often due to boredom experienced by confined house cats. All cats need to be allowed their most basic instincts and exercise may well lead to a longer and healthier life.

In prior art, the exercising scratch posts that have been created were fabricated from wood, rope and carpet and yet the cats still seem to destroy our furniture and drapery. This inventor has observed that cats appear to find wood, rope and carpet to be abrasive and potentially harmful to their claws because their claws do not effectively penetrate the wood and the materials don't shred and tear. Cats like to claw drapery and furniture material because their claws do easily penetrate and their shredding seems to give them more of a psychological sense of playful fulfillment. Loosely draped around the exercising toy—footstool is a upholstering like material designed to be clawed, shredded, replaced or recycled. Carpets naturally harbor fleas and ticks whereas these scratch-drape covers are designed to be washed or replaced for a much more sanitary living environment. These shreadable drape curtains provide an ideal satisfying alternative to the furnishings for the cat to stretch and sharpen its claws. The person using the toy footstool can now enjoy the actual feeling of the cat playing and the cat is able to feel and sense the direct contact of the owners presence, using the device as a physical communication medium, for a much closer mutual bond. This sensation of communication through feel is very important to a person who is blind.

It is another observation of this inventor that cats are naturally attracted to a mouse like toy inertly suspended in a mouse hole like some animals in the wild, whose only defense mechanism is being perfectly still, but yet it is their sudden movement that stimulates the innate preditoral instincts of a cat. When the mouse like toy is erratically animated the attraction is even more acute. When the shreadable drape curtain is used to partially obscure the suspended mouse like toy in the mouse hole and the device is animated, the cats curiosity is irresistibly challenged. By using a remote control switch the theater of mutual entertainment is enhanced to include the elderly, inactive bedridden and the handicapped.

SUMMARY OF THE INVENTION

The invention has a base with a support which has a mousehole like hole in the base of the support. Shreadable drape curtains are attached to the support to simulate real drapes and curtains. A toy is suspended from the support and a cat can play with the toy. A power source with a relay, motor, variable speed control, timer, and other animation means can be added to move the suspended member or toy.

It is an object of the invention to provide a novel entertaining exercise toy device intended to amuse, entertain, occupy pets and serve as a functional piece of furniture.

It is a further object of the invention to provide a theater of learning that stimulates the natural instincts of the pet cat by simulating the extremes of the predator prey relationship, from instinctive inert stillness of the prey to the sudden interrupted erratic life like movement.

It is another object of the invention to provide an entertaining exercise toy device that can be activated on by the pet or operator and after a time delay shut itself off.

It is further object of the invention to provide a shreadable drape curtain that offers an ideal alternative to the furnishings for the cat to sharpen its claws.

It is another object of the invention to provide to the person using the footstool—pet toy a means to communicate through the sense of feel the playful antics of the cat and allow the cat to feel and sense the closeness of the owner. The sense of feel being important to people with impaired vision.

It is further object of the invention to provide a exercising footstool—pet toy with an inside access that allows a cat its own personal psychological sanctuary.

It is another object of the invention to provide to the elderly and handicapped an opportunity to directly interact through play with their pets.

It is further object of the invention to provide a novel battery operated animating device for the mouse like toy however animation may be provided by other mechanical, electrical means, or a solenoid.

It is another object of the invention to provide the pet cat an opportunity to more actively use one of its basic natural clawing motions, that of inserting its paw into the mouse hole and fishing out the mouse.

It is further object of the invention to provide a common collection point for the pets loose hairs that naturally fallout. As the cat enters and plays, its loose hairs are attracted to the furniture material and are easily removed with a vacuum cleaner. This common collection area keeps the cats hairs away from the rest of the house where they may affect someone with allergies.

It is another object of the invention to provide a theater of amusing challenge, through play, for a confined pet house cat to insure the physical and psychological well-being of a pet cat.

Further objects are implicit in the detailed description which follows hereinafter (which is to be considered as exemplary of, but not specifically limiting, the present invention) and said objects will be apparent to persons skilled in the art after a careful study of the detailed description which follows.

For the purpose of clarifying the nature of the present invention, one exemplary embodiment of the invention is illustrated in the hereinbelow-described figures of the accompanying drawings and is described in detail hereinafter. It is to be taken as representative of the multiple embodiments of the invention which lie within the scope of the invention.

DESCRIPTION OF THE PREFERRED EMBODIMENTS

Figure 1:
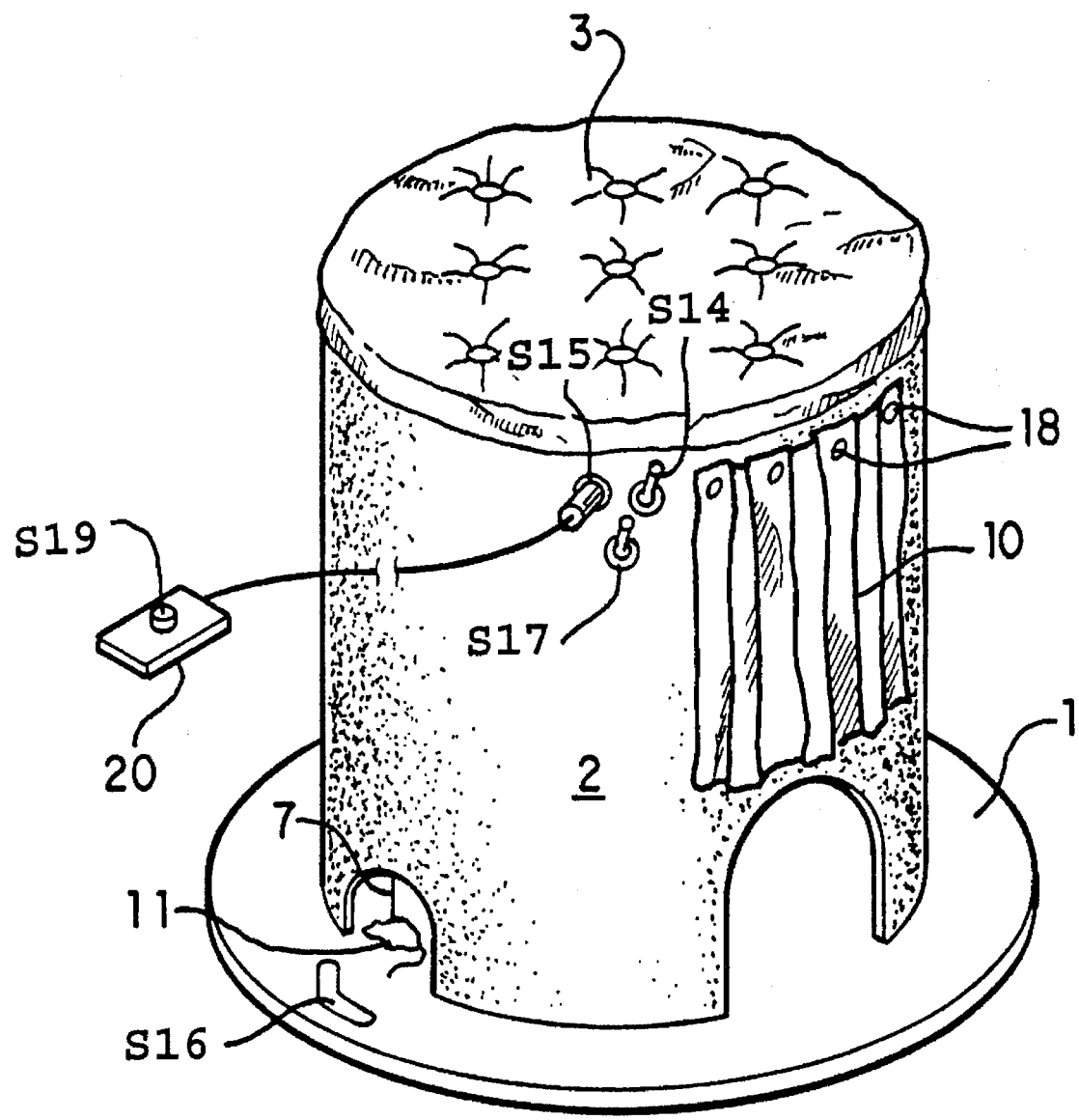
FIG. 1 is a perspective view showing one exemplary embodiment of one representative form of the invention.

Referring to FIG. 1, Base 1 is a low profile support for the footstool pedestal support 2 and is difficult to tip over.

Support 2 is mounted to base 1 by screws, however glue or other fasteners could also be used. The padded removable cushion 3 rests in the recessed top of support 2. The replaceable drape curtain 10 is fastened to support 2 by snaps 18, however adhesives or other types of fasteners may also be used. Remote control jack S15 is fastened to support 2 by screws however, other types of fasteners could also be used. Power switch S14 is used to apply power to the device so that the unit may be activated for manual or automatic operation. Switch S14 is fastened to support 2 by screws, however other styles of fasteners may also be used. The automatic-manual switch S17 is a center position off switch, in one direction it is a maintain position switch for constant timed animation, when activated to the other position it becomes a momentary push button used to activate the automatic time off circuit which shuts the unit off after a preset time delay. Switch S17, when in the maintain position, can also be toggled on and off for further animation. Switch S17 is fastened to support 2 by screws, however other fasteners could also be used. Remote control S19 connects to jack S19 15 by means of a safe low voltage cord, however a wireless remote could also be used. Remote control S19 is mounted to the remote control housing 20 by screws, however other types of fasteners could also be used.

Touch pad S16 is fastened to base 1 by screws, however other means of fastening could be used. Touch pad S16 is used to activate the automatic timing mode when touched by the pet. The first end of line 7 is fastened to suspended toy 11 by tying, however other methods of securing could also be used. The second end of line is fastened to actuator 9 by tying, however other means of fasteners may be used.

Figure 2:
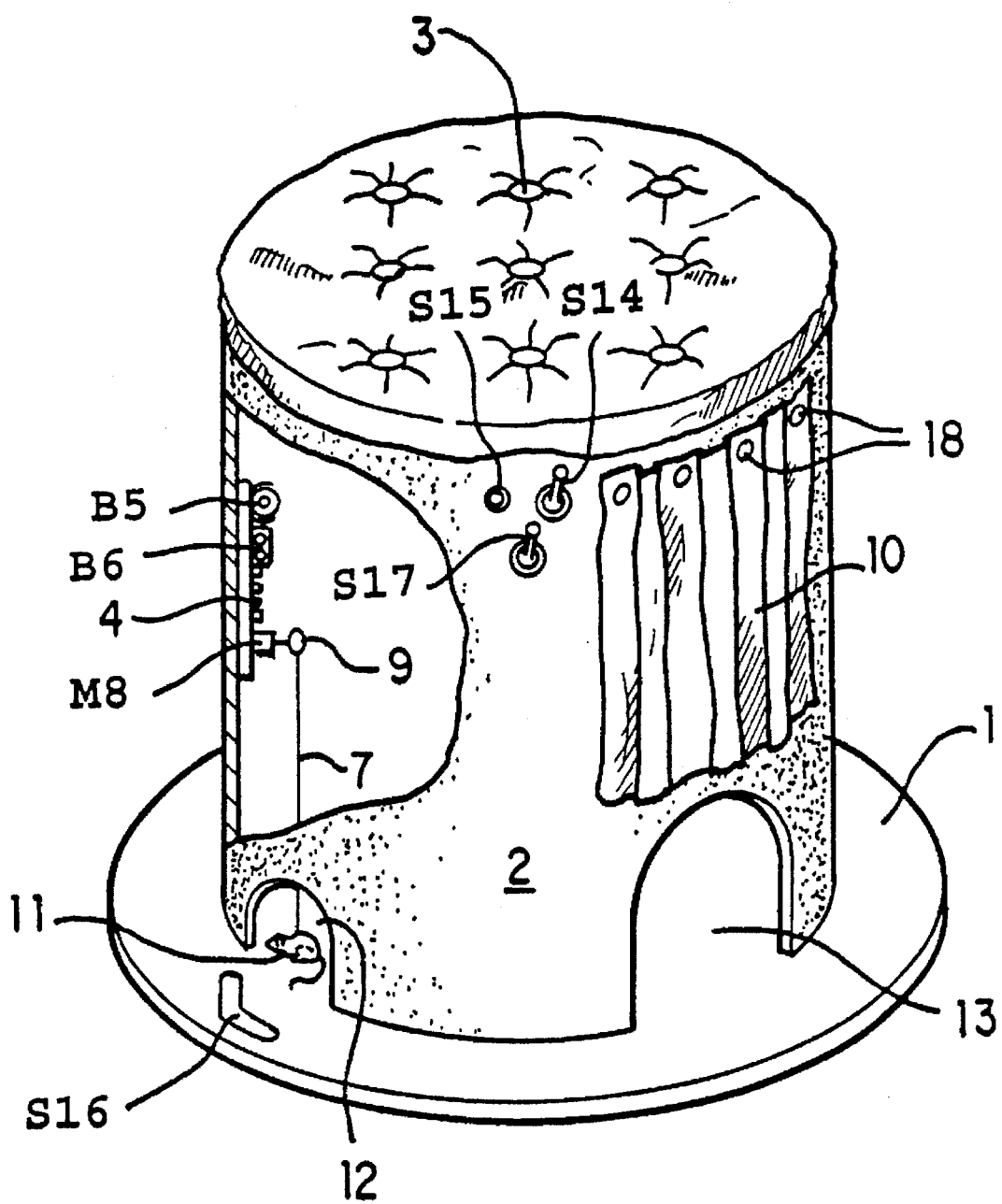
FIG. 2 is a perspective view showing one exemplary embodiment of one representative form of the invention.

Referring to FIG. 2, the electronic control circuit board 4 is fastened to support 2 by screws, however pop rivets or other types of fasteners could be used. The 1½ vdc battery B5 is installed in the electronic circuit board and held in place by spring tension, battery B5 provides the current to rotate the motor 8. Battery B6 is a 9 vdc battery that supplies current to all the electronic circuits, as defined in FIG. 3, on the electronic control circuit board 4. Battery B6 is also mounted on the circuit board 4 by spring tension, however the mounting and locating of batteries B6 and B5 could be accomplished by other means. Motor M8 is fastened to circuit board 4 by soldering, however other means of fastening or methods of locating could also be used. A solenoid, relay or other electrical, mechanical device could be used instead of a motor. The animating actuator 9 is pressed on the shaft of M8 however gluing, screws or other methods of coupling could also be used. Actuator 9 rests in close proximity to line 7, when the motor M8 is periodically energized, actuator 9 rotates, erratically moving line 7 causing life like animation of toy 11. The simulated mouse hole 12 provides area of access to suspend toy 11, which allows the cat to occupy and amuse itself by try to hook or fish out the animated mouse-like creature. The mouse hole 12 is in the shape as shown in FIG. 1 and FIG. 2, however other simulations of mouse holes could also be used. The internal access sanctuary 13 allows the cat access to its own personal space. In active play, the cats loose hairs are naturally attracted to the furniture like material and are easily collected for disposal making for a cleaner living environment.

Figure 3:
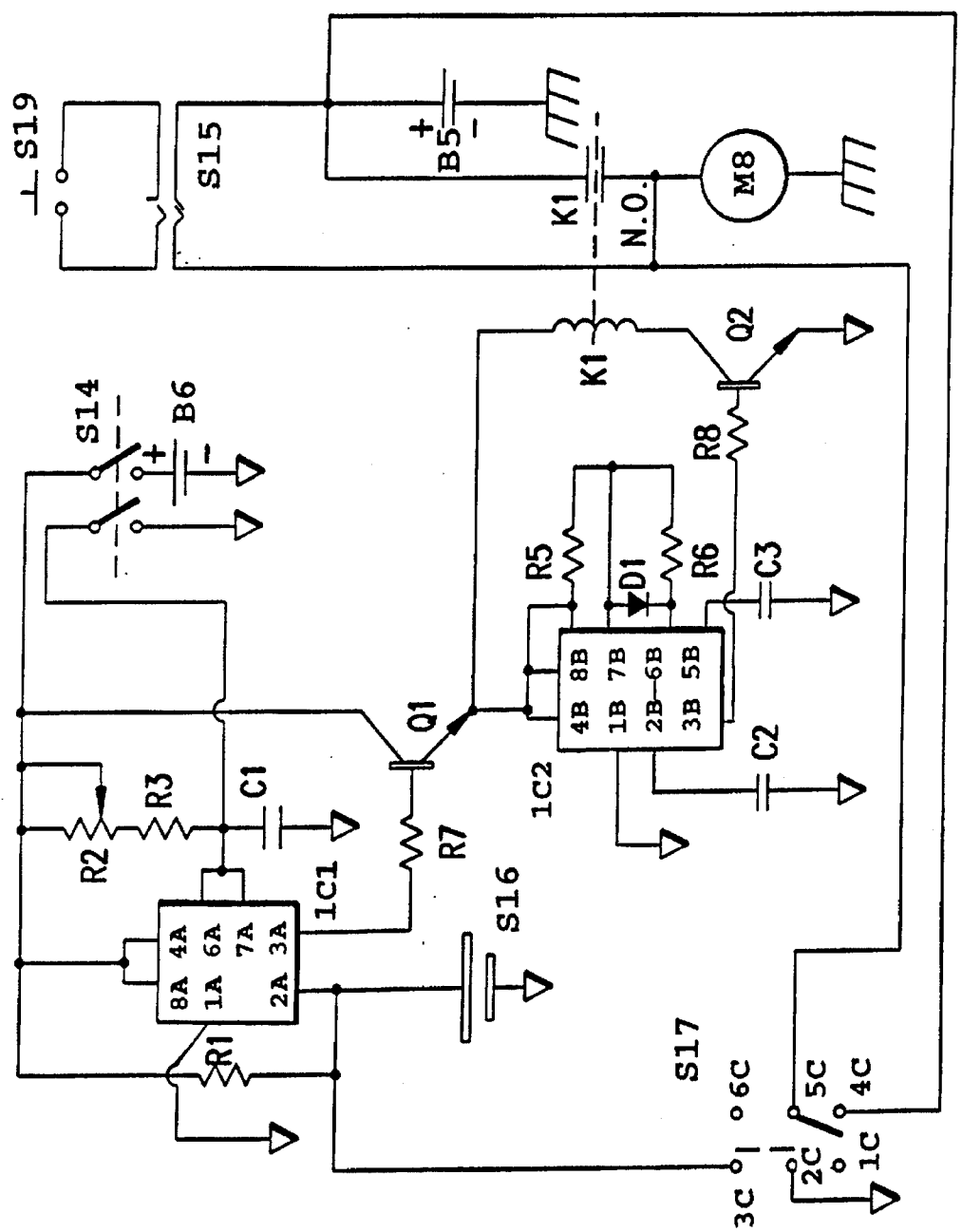
FIG. 3 is a circuit diagram showing one exemplary embodiment of one representative form of the invention.

Referring to FIG. 3, when S14 is actuated to the on position the positive pole of battery B6 is electrically connected to the collector of transistor (Q1), the wiper point of variable 3.5 m resistor (R2), one side of 3.5 m resistor (R2), to one side of 10 m resistor (R1) and to timer IC1 pins 4A and 8A, thereby arming the automatic timing circuitry. In the off position 14 applies ground to the junction of timer IC1 pins 6A, 7A, 1.5 m resistor (R3) and 330 mFarad capacitor (C1). Timer IC1 is connected in the configuration of a timer device having 8 terminals. Terminal 1A is electrically connected to ground. Terminal 2A is electrically connected to terminal 3C of switch S17, the other side of 10 m resistor R1 and one side of touch pad 16S that is used to activate the timer circuit IC1 when it is touched by the pet cat. Terminal 3 is connected to one side of 200 ohm resistor (R7), the other side of 200 ohm resistor (R7) is connected to the base of transistor (Q1). Pin 6A and 7A are electrically connected and are themselves connected to the junction of 330 mFarad capacitor (C1) and 1.5 m resistor (R3), the other side of 330 mFarad capacitor (C1) is connected to ground. Terminal 2C of 17 is connected to ground. Pin 5C of S17 is connected to one side of motor M8, one side of a normally open contact of relay (K1) and to one side of the remote control jack S15. Terminal 4C of 17 is connected to the positive pole of 1.5 volt d.c. battery B5, the negative side of battery B5 is electrically tied to isolated ground.

The emitter of transistor (Q1) is connected to the other side of the coil (K1) and to terminals 4B and 8B of the duty cycle sequencer timer IC2. Timer IC2 has 8 terminals, terminal 1B is connected to ground. Terminal 2B is connected to one end of 150 mFarad capacitor (C2) whose other side is connected to ground. Terminal 2B is also connected to pin 6B. Pin 3B is connected to one side of 200 ohm resistor (R8) whose other terminal is connected to the base of transistor (Q2). Terminal 5B is connected to one end of 0.01 mFarad capacitor (C3) and the other terminal of (C3) is connected to ground. Terminal 6B is connected to the cathode of diode (D1) and to one side of 200 ohm resistor (R6). Terminal 7B connects to the anode of diode (D1) and to the other end of 200K ohm resistor (R6) and to one side of 10K ohm resistor (R5).

The collector of transistor (Q2) is connected to the other side of coil (K1). The other side of motor M8 is connected to the ground provided by battery B5 which is an isolated ground from the ground provided by battery B6. The other side of normally open contact (K1) is connected to the positive pole of battery B5 and to the other terminal of jack S15.

When switch S14 is actuated to on, the timer circuit is armed. The operator actuates switch S17, which is a momentary switch in one direction, this starts the timer IC1 to begin timing or the cat touches the touch pad allowing the timer IC1 to start timing, either condition begins the automatic cycle which is defined IC1, (R1), (C1), (R2) and (R3). With timer IC1 activated, current flows to the base of transistor (Q1) through 200 ohm resistor (R7) causing transistor (Q1) to conduct allowing a non-inverting positive voltage to be applied to terminals 4B and 8B of timer IC2, thereby energizing the wave shaping duty cycle sequencer, whose output is shaped to turn on transistor (Q2) for short intervals of time until timer IC2 times out. As transistor (Q2) conducts, coil (K1) is energized, closing its normally open contacts coil (K1) allowing motor M8 and actuator 9 to rotate which in turn moves line 7 which animates suspended toy 11, until timer IC2 times itself out. This completes the automatic mode. When switch S17 is actuated to its other position which is a maintain position, reversible motor M8 is energized for the manual mode. Remote control switch S19 has 2 terminals, the first electrically connects to one terminal of S15, the other connects to the second terminal of S15 allowing for interactive remote control play from virtually any location for the handicapped.

What is claimed is:

1. An interactive pet device for the amusement of pets comprising:

a support having an opening shaped similarly to a mouse hole;

a suspended toy;

means for attaching said support to said suspended toy;

a solenoid for moving said suspended toy.

2. A device recited in claim 1, further including:

means for moving said suspended toy.

3. A device recited in claim 1, further including:

a power source for moving said suspended toy.

4. A device recited in claim 1 further including:

a variable speed control for moving said suspended toy.

5. A device recited in claim 1, further including:

a timer circuit for starting and stopping the movement of said suspended toy.

6. A device recited in claim 1, further including:

a motor for moving said suspended toy.

7. A device recited in claim 1, further including:

a duty cycle sequencer for moving said suspended toy.

8. A device recited in claim 1, further including:

drape curtains;

means for attaching said drape curtains to said support.

9. A device recited in claim 1, further including:

a base;

means for attaching said base to said support.

10. A device recited in claim 1, further including:

a remote control device for moving said suspended toy.

* * * * *